(12) United States Patent
Gentschev et al.

(10) Patent No.: US 8,697,800 B2
(45) Date of Patent: Apr. 15, 2014

(54) SILANE CROSS-LINKED 1-COMPONENT LAMINATION ADHESIVE

(75) Inventors: Pavel Gentschev, Bad Goisern (AT); Hans-Georg Kinzelmann, Pulheim (DE); Svenja Struempf, Solingen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/298,409

(22) Filed: Nov. 17, 2011

(65) Prior Publication Data

US 2012/0103516 A1  May 3, 2012

Related U.S. Application Data

(63) Continuation of application No. PCT/EP2010/056311, filed on May 10, 2010.

(30) Foreign Application Priority Data

Jun. 10, 2009  (DE) .......... 10 2009 026 900

(51) Int. Cl.
  *C08L 75/00* (2006.01)
  *C08L 83/00* (2006.01)
  *C09J 7/02* (2006.01)

(52) U.S. Cl.
  USPC ........... 524/590; 524/588; 524/591; 156/329

(58) Field of Classification Search
  USPC ............ 524/591, 588, 590; 156/329
  See application file for complete search history.

(56) References Cited

U.S. PATENT DOCUMENTS

| 3,632,557 | A | * | 1/1972 | Brode .............. 528/28 |
| 3,856,756 | A | * | 12/1974 | Wagner et al. ......... 528/49 |
| 5,143,995 | A | | 9/1992 | Meckel et al. |
| 5,990,257 | A | | 11/1999 | Johnston et al. |
| 7,332,541 | B2 | | 2/2008 | Schindler et al. |
| 7,635,743 | B2 | | 12/2009 | Wintermantel et al. |
| 2007/0299214 | A1 | | 12/2007 | Wakabayashi et al. |
| 2008/0293908 | A1 | | 11/2008 | Ludewig et al. |

FOREIGN PATENT DOCUMENTS

| DE | 10237271 | 3/2004 |
| DE | 102004062653 | 7/2006 |
| EP | 0464483 | 11/2011 |
| EP | 1674546 | 11/2011 |
| EP | 1995261 | 11/2011 |

* cited by examiner

*Primary Examiner* — Aiqun Li

(74) *Attorney, Agent, or Firm* — James E. Piotrowski

(57) ABSTRACT

The invention relates to a crosslinkable one-component lamination adhesive containing a) 25 to 80 wt % of polyester prepolymers, polyether prepolymers, and/or polyurethane prepolymers that comprise at least two crosslinkable silane groups, b) 75 to 20 wt % organic solvent having a boiling point of up to 130° C., c) 0 to 15 wt % additives, the prepolymer having a molecular weight from 2000 to 30,000 g/mol, wherein the viscosity of the adhesive is between 50 and 20,000 mPas (per DIN ISO 2555) measured at 15 to 45° C., and the crosslinked adhesive has a glass transition temperature from −10 to 30° C.

20 Claims, No Drawings

SILANE CROSS-LINKED 1-COMPONENT LAMINATION ADHESIVE

The invention relates to an adhesive based on polyurethanes, for adhesively bonding planar substrates, that can crosslink via hydrolyzable silane groups. The invention further relates to the use of this adhesive as a lamination adhesive for multi-layer films.

Transparent NCO-crosslinking one-component adhesives as reaction products of polyols and isocyanates are known in EP 0464483, in which isocyanates that comprise urea groups are used. Such urea groups produce strong hydrogen bridge bonding and thus usually high viscosity in the polymer. In addition, monomeric isocyanates in the context of polymer manufacture result in a residual monomer content of unhealthful isocyanates, which must be decreased by additional actions.

U.S. Pat. No. 5,990,257 is also known. It describes a method for manufacturing polyurethanes comprising silyl groups, isocyanates being used at a deficit with respect to polyols. Further OH groups are then reacted with isocyanatosilanes to produce prepolymers containing silyl groups. The polymers have a molecular weight of more than 12,000 g/mol. The viscosity is above 57 Pa·s. Use as a sealing compound that is intended to exhibit low tack after hardening is described as an application.

DE 10237271 discloses polymer compounds that contain alkoxysilane-terminated polymers. These are said to have a long skin-over time. As an advantage, acceleration of the reaction is promoted by considerable quantities of catalysts, and the skin that forms is said not to adhere to a metal surface. Tin compounds, which are objectionable in terms of health, are described as a catalyst. No materials suitable as a lamination adhesive are therefore described in this Application.

EP 1674546 is also known. This describes moisture-hardening compositions that are obtained from NCO-group-containing polyurethanes that are reacted with nucleophilically substituted silanes. The rapid reaction of these adhesives with moisture is described. The adhesives are used as melt adhesives, i.e. they exist as a solid at room temperature and can be applied only when hot.

The compositions of the existing art have a variety of disadvantages. Isocyanate-containing adhesives are objectionable in terms of health and safety protection. Storage is also possible only under strictly anhydrous conditions. Other lamination adhesives often exhibit poor initial adhesion to various substrates. A further disadvantage is the brittleness of such adhesives, which are then less suitable for flexible packages. Melt adhesives require a high application temperature, thereby the substrate films can be damaged.

An object of the present invention is therefore to make available an adhesive that is low in viscosity at room temperature and can be applied in a thin layer onto large substrate areas. It is intended to exhibit good adhesion to the substrates, and rapid adhesion buildup. After crosslinking, the adhesive layer is to comprise as few physiologically objectionable ingredients as possible, for example no primary aromatic amines. In addition, the adhesive is to be shelf-stable even in the presence of moisture.

The invention is achieved by a crosslinkable one-component lamination adhesive containing 25 to 80 wt % polyester prepolymers, polyether prepolymers, and/or polyurethane prepolymers that comprise at least two crosslinkable silane groups, 75 to 20 wt % organic solvent having a boiling point of up to 130° C., 0 to 15 wt % additives, the prepolymer possessing a molecular weight from 2000 to 30,000 g/mol, the viscosity of the adhesive being equal to between 50 and 20,000 mPas (per DIN ISO 2555) measured at 15 to 45° C., and the crosslinked adhesive having a glass transition temperature from −15 to 30° C.

Suitable polyesters for the manufacture of prepolymers according to the present invention are the known polyester polyols, for example in the form of polyester polyols or polyurethane polyols, that are reacted at least two sites with silane compounds that contain a group reactive with the polymer backbone and additionally at least one crosslinkable silane group. The polyester polyols are intended in particular to comprise two or more OH groups.

Suitable polyester polyols can be manufactured, for example, by polycondensation. For example, difunctional and/or trifunctional low-molecular-weight alcohols can be condensed with a deficit of dicarboxylic acids and/or tricarboxylic acids. Instead of free polycarboxylic acids, the corresponding polycarboxylic anhydride, or corresponding polycarboxylic acid esters with alcohols having by preference 1 to 3 carbon atoms, can also be used. Suitable dicarboxylic acids are, for example, succinic acid, adipic acid, suberic acid, azelaic acid, sebacic acid, and higher homologs thereof having up to 16 carbon atoms, also unsaturated dicarboxylic acids such as maleic acid or fumaric acid, dimer fatty acid or trimer fatty acid, or aromatic dicarboxylic acids, in particular the isomeric phthalic acids such as phthalic acid, isophthalic acid or terephthalic acid, anhydrides such as e.g. tetrahydrophthalic acid anhydride, hexahydrophthalic acid anhydride, glutaric acid anhydride, maleic acid anhydride, or mixtures or two or more such acids. Citric acid or trimellitic acid, for example, is suitable as a tricarboxylic acid that can optionally be added in part. The quantities are selected so that terminal OH-functional polyester diols are obtained. In a preferred embodiment, mixtures of aliphatic and aromatic carboxylic acids are obtained.

Aliphatic alcohols are suitable in particular for manufacturing such polyester polyols. Included among the suitable aliphatic alcohols are, for example, ethylene glycol, propylene glycol, 1,4-butanediol, 1,5-pentanediol, 1,6-hexanediol, 1,7-heptanediol, 1,8-octanediol, and higher homologs or isomers thereof, 1,4-hydroxymethylcyclohexane, 2-methyl-1,3-propanediol, triethylene glycol, ethylene glycol, polyethylene glycol, dipropylene glycol, polypropylene glycol, dibutylene glycol, and polybutylene glycol.

Also suitable are higher-functional alcohols such as, for example, glycerol, trimethylolpropane, pentaerythritol, neopentyl glycol, and oligomeric ethers of the aforesaid substances with themselves or mixed with two or more of the aforesaid ethers with one another.

Suitable polyols for manufacturing the polyesters are also reaction products of low-molecular-weight polyfunctional alcohols with alkylene oxides, so-called polyethers. The alkylene oxides preferably have 2 to 4 carbon atoms. The reaction products of ethylene glycol, propylene glycol, the isomeric butanediols, hexanediols, or 4,4′-dihydroxydiphenylpropane with ethylene oxide, propylene oxide, or butylene oxide, or mixtures of two or more thereof, are, for example, suitable. Also suitable are the reaction products of polyfunctional alcohols such as glycerol, trimethylolethane, or trimethyolpropane, pentaerythritol, or sugar alcohols, or mixtures of two or more thereof, with the aforesaid alkylene oxides to yield polyester polyols. These are to have a molecular weight from approximately 400 to approximately 2000 g/mol.

Polyester polyols that are produced from the reaction of low-molecular-weight alcohols, in particular of ethylene glycol, diethylene glycol, neopentyl glycol, hexanediol, butanediol, propylene glycol, glycerol, or trimethylolpropane with lactones, in particular caprolactone, are likewise suitable.

1,4-Hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol, and polybutylene glycol are also suitable as alcohols.

Polyester polyols of oleochemical derivation can, however, also be used. "Oleochemical" polyols are understood as polyols based on natural oils and fats, e.g. the reaction products of epoxidized fatty substances with mono-, di-, or polyfunctional alcohols or glycerol esters of long-chain fatty acids that are at least partly substituted with hydroxyl groups. Such polyester polyols can be manufactured, for example, by complete ring opening of epoxidized triglycerides of an at least partly olefinically unsaturated fatty acid-containing fat mixture using one or more alcohols having 1 to 12 carbon atoms, and subsequent partial transesterification of the triglyceride derivatives to yield alkyl ester polyols having 1 to 12 carbon atoms in the alkyl residue. Further suitable polyols are polycarbonate polyols and dimer diols (Henkel Co.), as well as castor oil and derivatives thereof.

Methods for manufacturing such OH-functional polyesters are known. Such polyester polyols are also commercially obtainable.

Another class of polyols suitable as a polymer backbone are polyether polyols. The known reaction products of diols or triols such as ethylene glycol, 1,2- or 1,3-propylene glycol, 1,4- or 1,3-butylene glycol, 1,6-hexanediol, 1,8-octanediol, neopentyl glycol, 1,4-hydroxymethylcyclohexane, 2-methyl-1,3-propanediol, glycerol, trimethylolpropane, 1,2,6-hexanetriol, with alkylene oxides such as e.g. propylene oxide, butylene oxide, are suitable as polyether polyols. These polyols can comprise two or three OH groups. Such polyols are commercially obtainable.

The molecular weight of the polyols is intended to be equal to approximately 400 to 30,000 g/mol (number-average molecular weight, $M_N$, as determinable by GPC), in the case of polyester polyols or polyurethane polyols in particular from 2000 to 20,000 g/mol, in the case of polyether polyols in particular from 400 to 10,000 g/mol. At least 50% of the prepolymers used are preferably intended to be based on polyester polyols, in particular exclusively polyester polyols, particularly preferably polyester diols having terminal OH groups.

In an embodiment, NCO-group-containing prepolymers can be manufactured from the above-described polyester polyols and/or polyether polyols by reaction with an excess of diisocyanates. In this context, the polyols in liquid or melted form, optionally also containing solvent, are reacted with diisocyanates. This can also be assisted by elevated temperature; it is likewise known that small quantities of catalysts can be added. By way of the selection of the isocyanates and the quantity, it is possible to ensure that only small proportions of free, unreacted diisocyanates are present in the reaction mixture. It is also optionally possible to remove excess monomeric isocyanates by distillation. Such methods are known to one skilled in the art. The polyester can contain only terminal NCO groups, or polyurethane prepolymers having reactive NCO groups form as a result of molecular weight buildup. These polyurethane prepolymers are also suitable for synthesis of the silane-containing prepolymers to be used according to the present invention.

The known aliphatic or aromatic diisocyanates are suitable in particular as isocyanates, such as 1,6-hexamethylene diisocyanate (HDI), 1-isocyanato-3,3,5-trimethyl-5-isocyanatomethylcyclohexane (IPDI), xylylene diisocyanate (XDI), tetramethylxylylene diisocyanate (TMXDI), 2,4- or 2,6-toluoylene diisocyanate (TDI), 2,4'-diphenylmethane diisocyanate, 2,2'-diphenylmethane diisocyanate, or 4,4'-diphenylmethane diisocyanate (MDI), as well as isomer mixtures thereof, cyclohexyl diisocyanate (CHDI), hexahydroxylylene diisocyanate (HXDI), m-xylylene diisocyanate (XDI), naphthalene diisocyanate (NDI), or bitoluoylene diisocyanate (TODI). The quantity is selected so that an NCO-terminated prepolymer is obtained.

In an embodiment of the invention, these NCO-group-containing reaction products are then reacted with silanes that, in addition to a nucleophilic group, contain hydrolyzable silane groups.

Organofunctional silanes such as hydroxyfunctional, mercaptofunctional, or aminofunctional silanes of the general formula $$\text{Nu-(alkyl-Si}(R^2)_a F_b)_c,$$

where
Nu=NH, NH$_2$, SH, OH
alkyl=C$_1$, C$_2$, C$_3$, C$_4$, C$_6$, linear or branched or cycloalkyl,
R$^2$=methyl, ethyl, propyl, butyl,
a=0, 1, 2
F=—Cl, —O—C(=O)R$^1$, —OR$^1$, —OH,
b=1, 2, 3,
R$^1$=hydrocarbon residue having 1 to 20 carbon atoms,
c=1, 2
are used as suitable silanes. The silane groups are intended to contain at least one, preferably two or three, hydrolyzable residues. C$_1$ to C$_6$ alcohols or C$_2$ and C$_3$ carboxylic acids or OH groups are particularly suitable. These residues can be contained either exclusively or in mixed fashion on the silicon atom. In addition, 0, 1, or 2 alkyl groups can be contained on the silicon atom, in particular methyl, ethyl, propyl, or butyl groups. Tri- or dialkoxysilanes having methoxy, ethoxy, propoxy, or butoxy groups are particularly suitable.

Examples of mercaptofunctional silanes are 3-mercaptopropylthmethoxysilane, 3-mercaptopropyltrimethoxysilane or the corresponding alkyldimethoxy or alkyldiethoxy compounds. Examples of aminofunctional silanes are 3-aminopropyltrimethoxysilane (AMMO), 3-aminopropyltriethoxysilane (AMEO), 3-aminopropylmethyldimethoxysilane, 3-aminopropylmethyldiethoxysilane, N-(2-aminoethyl)-3-aminopropyltrimethoxysilane (DAMO), N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-aminoethyl)-3-aminopropyltriethoxysilane, N-(2-aminoethyl)-N'-(2-aminoethyl)-3-aminopropylmethyldimethoxysilane, N-(2-aminoethyl)-N'-(2-aminoethyl)-3-aminopropylmethyldiethoxysilane, bis-(triethoxysilylpropyl)amine, bis-(trimethoxysilylpropyl)amine, N-(2-aminobutyl)-3-aminopropyltriethoxysilane, N-(2-aminobutyl)-3-aminopropyltrimethoxysilane, N-(n-butyl)-3-aminopropyltrimethoxysilane, N-(n-butyl)-3-aminopropyltriethoxysilane, N-(n-butyl)-3-aminopropylalkoxydiethoxysilane, 3-glycidyloxymethyltrimethoxysilane, 3-glycidyloxymethyltriethoxysilane, 2-glycidoxyethyltrimethoxysilane, or mixtures thereof, as well as corresponding compounds that carry a different alkyl group instead of the respective propyl group. A preferred embodiment uses aminosilanes for reaction with the isocyanate prepolymers, in particular α-functionalized silanes, particularly preferably α-aminosilanes. Mixtures of several silanes can also be used.

The quantity of silane compounds to be reacted is selected so that all the isocyanate groups of the prepolymer have reacted with a nucleophilic group of the silane compound. It is possible for a slight excess of nucleophilic silanes to be used. It is thereby possible to ensure that no free isocyanate groups are present in the silane-terminated prepolymers. An excess of silanes too great is to be avoided, in order to minimize the content of low-molecular-weight amino compounds.

Another embodiment of the invention reacts the OH-functional polyesters and/or polyesters, described above as a polymer backbone, with silanes in accordance with the formula indicated above, with the provision that Nu is an isocyanate group. The compound then contains hydrolyzable groups and an isocyanate group. Examples of such silanes are trimethoxysilylpropyl isocyanate, trimethoxysilylpentyl isocyanate, trimethoxysilylbutyl isocyanate, or the corresponding triethoxy or tripropoxy compounds. The corresponding dialkoxyalkylsilyl isocyanate compounds are likewise suitable.

The quantity of isocyanatosilane compounds is selected so that the molar quantity of the isocyanate groups corresponds to the molar quantity of OH groups of the hydroxyfunctional polyol. Silane-functional prepolymers are obtained in this case as well.

A further embodiment selects the above-indicated polymers as a polymer backbone in such a way that they contain functional groups that can react with silane compounds that additionally contain an epoxy group or an anhydride group. The polymers, in particular the polyols, are then linked via ester groups or via glycidyl ethers to the hydrolyzable silane groups.

Prepolymers suitable according to the present invention must comprise crosslinkable silane groups. The number of hydrolyzable silane groups per molecule is to be equal to at least two or more. In a particular embodiment, the silane groups are terminal to the polymer chain. The prepolymers should preferably be free of NCO groups.

The reaction products suitable according to the present invention are prepolymers that contain silane groups. These prepolymers usually comprise at least two, preferably several urethane groups. The glass transition temperature of the reaction products in solvent-free form is to be between −40 and 0° C., in particular between −35° C. and −10° C. (measured using DSC). The glass transition temperature can be influenced by the quantity of aromatic components of the polymer backbone or isocyanate. It has been found that silane-reactive prepolymers that have been manufactured on the basis of aromatic isocyanates are particularly suitable. Examples thereof are TDI, NDI, 4,4-MDI, 2,4-MDI, mXDI, or TMXDI.

Lamination adhesives can be formulated from the above-described silane-functionalized prepolymers. It is possible for additional constituents to be contained in these lamination adhesives, for example solvents, plasticizers, catalysts, stabilizers, adhesion promoters, and even, in a less preferred embodiment, pigments and fillers.

Plasticizers that can be used are, for example, medicinal white oils, naphthenic mineral oils, paraffinic hydrocarbon oils; polypropylene, polybutene, polyisoprene oligomers; hydrogenated polyisoprene and/or polybutadiene oligomers; phthalates, adipates, benzoate esters, vegetable or animal oils, and derivatives thereof. Phenols, sterically hindered phenols of high molecular weight, polyfunctional phenols, sulfur- and phosphorus-containing phenols or amines can be selected as usable stabilizers or antioxidants.

An adhesive according to the present invention can also contain pigments or fillers. The quantities are to be equal to 0 to 5 wt %. The adhesive should preferably be transparent, and nanoscale fillers are therefore particularly suitable. It is also possible to select fillers that have in the adhesive a suitable refraction index such that a transparent or only slightly cloudy adhesive is obtained.

It is possible additionally to add silane compounds to the adhesive as adhesion promoters. The silanes listed above, or by preference organofunctional silanes such as (meth)acryloxy-functional, epoxy-functional, or non-reactively substituted silanes can be used as adhesion promoters. In a preferred embodiment, 0.1 to 3 wt % of such silanes are added to the adhesive. Examples thereof are 3-acryloxypropyltrialkoxysilane or 3-methacryloxypropyltrialkoxysilane; epoxy-functional silanes such as 3-glycidyloxymethyltrimethoxysilane, 3-glycidyloxymethyltriethoxysilane, 2-glycidoxyethyltrimethoxysilane; vinyltrimethoxysilane, alkyltriethoxysilane, or corresponding di- or trialkoxy derivatives. These can optionally be incorporated into the polymer network.

Optionally as additionally present additive an adhesive suitable according to the present invention can also contain catalysts. All known compounds that can catalyze hydrolytic cleavage of the hydrolyzable groups of the silane groupings, as well as subsequent condensation of the Si—OH group to yield siloxane groupings, can be used as catalysts. Examples thereof are titanates such as tetrabutyl titanate or titanium tetraacetyl acetonate; bismuth compounds such as bismuth tris-2-ethylhexanoate; tin carboxylates such as dibutyltin dilaurate (DBTL), dibutyltin diacetate, or dibutyltin diethylhexanoate; tin oxides such as dibutyltin oxide and dioctyltin oxide; organoaluminum compounds such as aluminum trisacetylacetonate; chelate compounds such as zirconium tetraacetylacetonate; amine compounds or salts thereof with carboxylic acids, such as octylamine, cyclohexylamine, benzylamine, dibutylamine, monoethanolamine, di- or triethanolamine, triethylamine, tripropylamine, tributylamine, diethanolamine, dipropylamine, dibutylamine, diethylenetriamine, triethylenetetramine, triethylenediamine, guanidine, morpholine, N-methylmorpholine, and 1,8-diazabicyclo-(5,4,0)-undecene-7 (DBU); silane compounds having amino groups. The catalyst or mixtures are used in a quantity from 0.01 to approximately 5 wt % based on the entire weight of the preparation. 0.05 to 4 wt %, particularly preferably from 0.2 to 3 wt % catalyst is preferred. It is preferred if the adhesive contains no tin catalysts. In particular, other heavy-metal-containing catalysts can also be avoided. In a particular embodiment an adhesive according to the present invention contains volatile amines, in particular those that can evaporate at temperatures of up to 45° C.

According to the present invention the adhesives also contain solvents. These are the ordinary solvents that can evaporate at temperature of up to 130° C., in particular having a boiling point below 100° C. The solvents can be selected from the group of the aliphatic hydrocarbons, aromatic hydrocarbons, ketones, alcohols. Alcohols in particular are to be contained at least in part. These can be, for example, the known $C_1$ to $C_6$ monoalcohols. A preferred embodiment contains propanol and/or ethanol as a solvent. The solvents serve to lower and adjust the viscosity. The proportion of solvents can vary within wide limits, for example from 20 to 75% based on the adhesive. It is known in this context to adjust the adhesive to high viscosity in a delivery form; it can then be diluted to a suitable viscosity with further solvent prior to application. It is possible for alcohols to be added in this context already during manufacture, or only later prior to application. It is possible in particular for the adhesive according to the present invention to contain up to 66% of the aforesaid alcohols, based on the sum of the solvents. It has been found to be useful if the adhesive according to the present invention contains at least 5 wt % alcohol.

The solvents used according to the present invention need not be anhydrous. It is known that in the context of isocyanate-containing adhesives, the constituents and also the solvents must be anhydrous in order to prevent premature reaction with the isocyanate groups. With the composition according to the present invention, however, it is has been found that the adhesives can contain up to 8% water. The quantity of water is preferably to be equal to 0.1 to 5 wt %, in particular above 0.3 wt %. The quantity of water is to be selected so that a homogeneous adhesive solution is still obtained. No phase separation should occur.

The viscosity of the lamination adhesives is intended to be low at application temperature. The latter can be equal to up to 45° C., in particular up to 35° C. The viscosity of the suitable lamination adhesives is to be between 50 and 20,000 mPas measured at 15 to 45° C., preferably 100 to 5000 mPas (measured according to Brookfield, per ISO 2555). The adhesive is usually diluted with solvent for application. The viscosity can in this context be equal to from approx. 50 mPas to 800 mPas (at 20 to 48° C.). Application related measurements are to be equal to between 12 and 28 seconds (Ford cup, 4 mm, ASTM D 1200). The solids content in the application form is preferably between 15 and 60%, particularly preferably 30 to 50 wt %. Because rapid further processing is necessary, the adhesives are intended to crosslink quickly and build up sufficient cohesion and adhesion. According to the present invention, crosslinking of the applied adhesive is possible even when the substrates to be bonded contain little moisture. This is supported by the quantity of water in the adhesive.

The adhesives according to the present invention are shelf-stable. They can be stored for a long period of time without premature crosslinking, even in a hydrous form. It is usual to store a low-solvent form, which can have a higher viscosity. In an embodiment, it is possible to heat this reduced-solvent lamination adhesive for application, and then apply it. In another embodiment, the adhesive is diluted to a low viscosity with solvents upon use, and then applied. A further subject of the invention is use of the crosslinkable silane-functionalized adhesives according to the present invention to manufacture multi-layer films. The known flexible films, such as polymer films, paper films, metal foils, or surface-treated films, can be used as film materials for manufacturing multi-layer films. These are substrates made of thermoplastics in film form, for example polyolefins such as polyethylene (PE) or polypropylene (PP, CPP, OPP), polyvinyl chloride (PVC), polystyrene (PS), polyesters such as PET, polyamide, organic polymers such as cellophane; metal foils or paper are also suitable as substrates. The film materials can also be modified, for example, by modifying the polymers with functional groups or by means of metal or oxide coatings; or additional components, for example pigments, dyes, or foamed layers, can be contained in the film. The films can be colored, imprinted, colorless, or transparent.

In the context of the use according to the present invention, two or more identical or, in particular, different films are bonded to one another with a one-component adhesive suitable according to the present invention. In an embodiment of the invention, one film can already be imprinted in color before application of the lamination adhesive. A liquid lamination adhesive according to the present invention is then applied onto the optionally pretreated film. This can occur by way of pressure methods known per se, e.g. using patterned rollers, smooth rollers; the adhesive is sprayed via nozzles; or the adhesive is applied via slit nozzles. The application method is to be selected as a function of the viscosity of the adhesive.

It is possible to obtain a low application viscosity by selecting the crosslinkable one-component lamination adhesives according to the present invention. The adhesive suitable according to the present invention has a low viscosity; therefore application at a low layer thickness from 1 to 25 µm, in particular from 2 to 15 µm, is possible.

The multi-layer film is manufactured by joining together a film coated with the adhesive and a second film. Adhesive bonding of two coated films is possible but less preferred. Bonding can occur under pressure and at elevated temperature. If applicable, multiple films can also be bonded to one another. Lamination methods of this kind are known to one skilled in the art.

The adhesive according to the present invention can be used in particular as a lamination adhesive, in which context the adhesives are applied in a thin layer onto a film. The solvents that are contained evaporate immediately thereafter, and a second film is then applied onto the adhesive layer and compressed under pressure. The composition according to the present invention makes it possible to use low-molecular-weight alcohols as solvents, for example methanol, ethanol, or propanol; these are less objectionable than other solvents in terms of food regulations. Other solvents can be reduced and avoided by means of the working procedure according to the present invention.

Selection of the preferred crosslinking via alkoxysilane groups makes it possible for the adhesive to crosslink quickly. Bubbles, which cannot be avoided in isocyanate-based adhesives in the context of highly reactive systems, do not occur as a result of the reaction. The adhesives according to the present invention have the advantage that the necessary solvents do not need to be dried. The manufacture, storage, and application process for the adhesives according to the present invention is thereby simplified. A further advantage of the lamination adhesive according to the present invention is good flexibility. It has been found that the adhesive according to the present invention has a predetermined $T_g$. This is intended to result in a flexible adhesively bonded multi-layer film after crosslinking.

The $T_g$ of the crosslinked adhesive is to be equal to between −15 and +30° C., in particular between −10 and +20° C. A specimen of the complete adhesive of less than 0.5 g, that has been heated from 0 to 200° C. at a heating rate of 10 K per minute, is to be regarded as a solvent-free crosslinked state. The $T_g$ of the crosslinked material can then be determined by DSC.

Additionally subject of the invention is a multi-layer film that is adhesively bonded with a lamination adhesive suitable according to the present invention; the known plastic films, for example made of polypropylene, polyethylene, polyester, PVC, polyamide, or others, can be used in this context as substrates. Onto this film, a continuous layer is generated using an adhesive according to the present invention and is adhesively bonded, immediately after application, to a second identical or different film. In addition to the two-layer films, it is also possible to generate a multi-layer film using further working steps. An embodiment according to the present invention bonds transparent films; it is useful for this if the adhesive according to the present invention is likewise transparent and not colored.

Other layers, for example made of paper, metal films, or other barrier layers, can also be contained in these multi-layer films. These multi-layer films can rapidly be further processed after bonding, since a high initial adhesion and fast crosslinking are produced. Laborious storage, in order to await crosslinking or a secondary reaction, can be omitted.

The adhesive according to the present invention exhibits good adhesion between the different layers. It is, in particular, transparent after crosslinking, i.e. colorless and see-through, for example in layer thicknesses of up to 0.5 mm. It exhibits no bubbles or defects in the adhesive layer. It is therefore especially suitable as a lamination adhesive for bonding flexible substrates in film form.

EXAMPLES

Example

Polyester 1

A polyester is manufactured from adipic acid and isophthalic acid together with ethylene glycol.

The polyester has a molecular weight of approx. 2000 g/mol. The OH number is equal to approx. 58; the acid number is less than 2. The $T_g$ is approx. −30° C.

Example

Polyester 2

A polyester is manufactured from adipic acid, isophthalic acid, azelaic acid, and phthalic acid together with diethylene glycol, ethylene glycol, propylene glycol, and neopentyl glycol.

The polyester has a molecular weight of approx. 5100 g/mol. The OH number of the polyester is equal to approx. 22. The $T_g$ is approx. −24° C.

Example

Polyester 3

A polyester is manufactured from sebacic acid and isophthalic acid together with neopentyl glycol.

The polyester has a molecular weight of approx. 2000 g/mol. The OH number is equal to approx. 60; the acid number is less than 2.

Example 4

57 parts of polyester 3 are dissolved in 33 parts ethyl acetate and then reacted with 6.5 parts TDI. Then 3.0 parts bis(3-triethoxysilylpropyl)amine are added.

The resulting adhesive has a solids content of 65%. The viscosity is 5400 mPas (20° C.). A crosslinked test specimen of the adhesive has a glass transition temperature of 1° C.

Example 5

51.5 parts of polyester 1 are dissolved in 38.5 parts ethyl acetate and then reacted with 6 parts TDI 80. Then 4.3 parts bis(3-triethoxysilylpropyl)amine are added.

The resulting product has a solids content of 62%. It contains no further isocyanate groups. The viscosity is approx. 1400 mPas (20° C.). The $T_g$ (crosslinked) is −2° C.

Example 6

63.0 parts of polyester 2 are dissolved in 30.0 parts ethyl acetate and then reacted with 3.45 parts TDI 100 and 4.15 parts bis(3-triethoxysilylpropyl)amine.

The resulting product has a solids content of 70%. It contains no further isocyanate groups. The viscosity is approx. 7750 mPas (20° C.). The $T_g$ (crosslinked) is +4° C.

Example 7

61.2 parts of polyester 2 are dissolved in 34.5 parts ethyl acetate and then reacted with 5.0 parts TDI 100 and 1.4 parts N-cyclohexylaminomethylmethyldiethoxysilane. The resulting product has a solids content of 65%. It contains no further isocyanate groups. The viscosity is approx. 6700 mPas (20° C.).

Adhesive Bonding:

The adhesives are diluted with 20 parts EtOH (5% water). The viscosity in this context is below 800 mPas (20° C.). Films based on PE are coated with a ductor blade using the adhesives according to the present invention of Examples 4 to 7. The layer thickness is 5 μm. Another film is coated analogously at a layer thickness of 10 μm. The coated surface is brought to 30° C. for approx. 1 minute for flash-off. A second film based on OPP is then squeezed with a roller onto the respective coated film.

After 12 hours, the adhesive bonding of the two film substrates is determined. Good mutual adhesion is observed in all cases.

What is claimed is:

1. A crosslinkable one-component lamination adhesive comprising:
   a) 25 to 80 wt % of at least one polyester prepolymer, polyether prepolymer, or polyurethane prepolymer that comprises at least two crosslinkable silane groups,
   b) 75 to 20 wt % organic solvent having a boiling point of up to 130° C.,
   c) 0 to 15 wt % additives,
   d) 0.1 to 8 wt % water,
   the prepolymer possessing a molecular weight from 2000 to 30,000 g/mol, the viscosity of the adhesive being equal to between 50 and 20,000 mPas (per DIN ISO 2555) measured at 15 to 45° C., and the crosslinked adhesive having a glass transition temperature from −15 to 30° C.

2. The one-component adhesive according to claim 1, wherein at least one polyester prepolymer or polyurethane prepolymer is used, manufactured from polyester polyols containing at least two OH groups having a molecular weight from 400 to 20,000 g/mol.

3. The one-component adhesive according to claim 2, wherein the polyester prepolymer is manufactured from polyester polyols reacted with a molar excess of diisocyanates to yield NCO-polyester prepolymers, with subsequent reaction of all NCO groups of the NCO prepolymers with nucleophilically substituted alkyl alkoxy silanes.

4. The one-component adhesive according to claim 1, wherein the at least one polyester prepolymer or polyurethane prepolymer, is manufactured from polyester polyols reacted with NCO-substituted alkyl alkoxy silanes.

5. The one-component adhesive according to claim 1 comprising a polyether prepolymer manufactured by reacting polyether polyol with diisocyanates to yield an NCO-containing prepolymer, and subsequent reacting the NCO-containing prepolymer with nucleophilically substituted alkyl alkoxy silanes.

6. The one-component adhesive according to claim 1, wherein the adhesive contains at least 50% prepolymers on the basis of polyester polyols, based on the quantity of prepolymers.

7. The one-component adhesive according to claim 1, wherein aminosilanes are used in the manufacture of the prepolymers.

8. The one-component adhesive according to claim 1, wherein alpha-aminosilanes are used in the manufacture of the prepolymers.

9. The one-component adhesive according to claim 1, wherein the prepolymer comprises trialkoxysilane groups, in particular triethoxysilane groups.

10. The one-component adhesive according to claim 1, wherein the adhesive further comprises up to 50 wt % alcohols based on the adhesive.

11. The one-component adhesive according to claim 1, wherein the additives are selected from at least one of catalyst, stabilizer, adhesion promoter, pigment or filler.

12. The one-component adhesive according to claim 1, wherein the adhesive is free of heavy-metal catalysts.

13. The one-component adhesive according to claim 1, wherein the adhesive is free of tin catalysts.

14. The one-component adhesive according to claim 1, wherein the adhesive contains volatile amines.

15. The one-component adhesive according to claim 1, wherein the adhesive is transparent after crosslinking in thicknesses up to 0.5 mm.

16. A method of making a multi-layer laminate, comprising:
   providing a first film or foil having opposing first and second surfaces;
   providing a second film or foil having opposing first and second surfaces;
   applying the one-component adhesive according to claim 1 on at least a portion of the first surface of one film or foil surface;
   placing the first surface of the other film or foil in contact with the applied adhesive to form the multi-layer laminate.

17. The method according to claim 16, comprising the step of curing the applied one-component adhesive to bond the first film or foil to the second film or foil.

18. The method according to claim 16, comprising the step of evaporating solvent from the applied one-component adhesive prior to the step of placing the other film or foil surface in contact with the disposed adhesive.

19. The method according to claim 16, wherein the first and second films or foils are independently selected from polymer films, paper films, metal foils and surface-treated films.

20. The one-component adhesive according to claim 1, wherein the adhesive is shelf stable.

* * * * *